Feb. 22, 1938.  C. L. BOWMAN  2,109,081
CUTTER BAR
Original Filed May 24, 1935
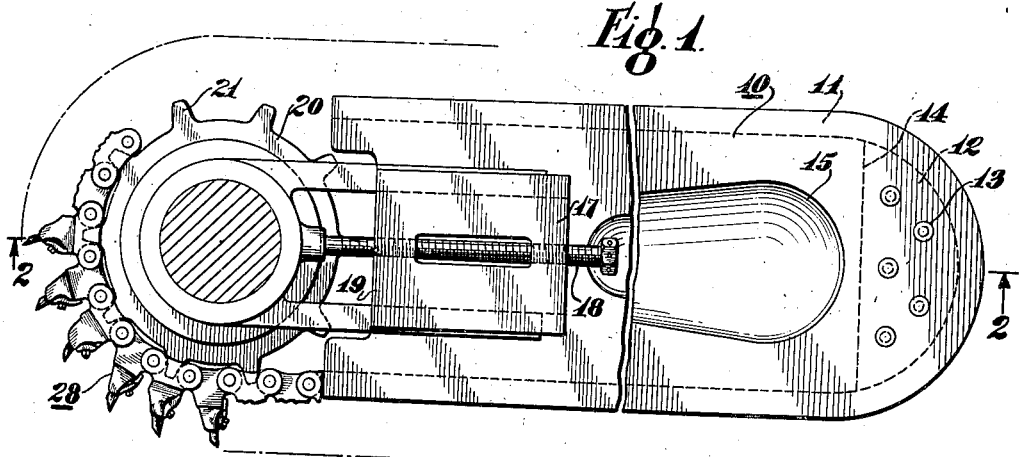
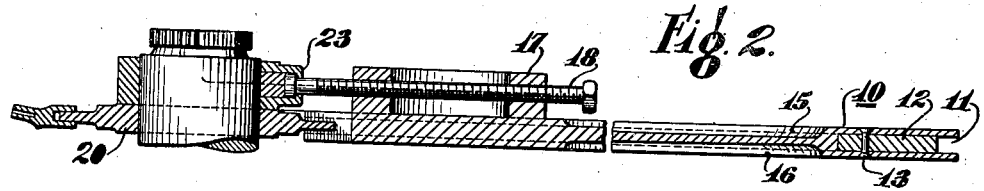
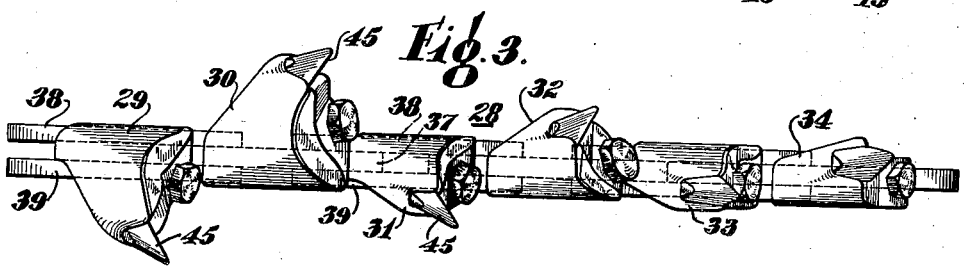
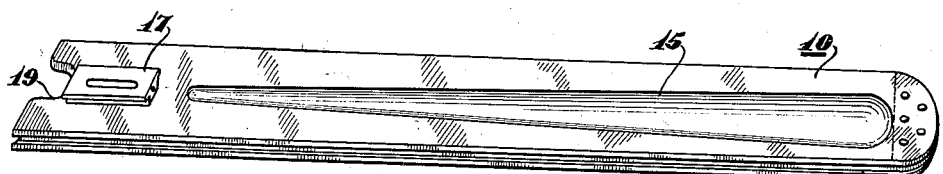
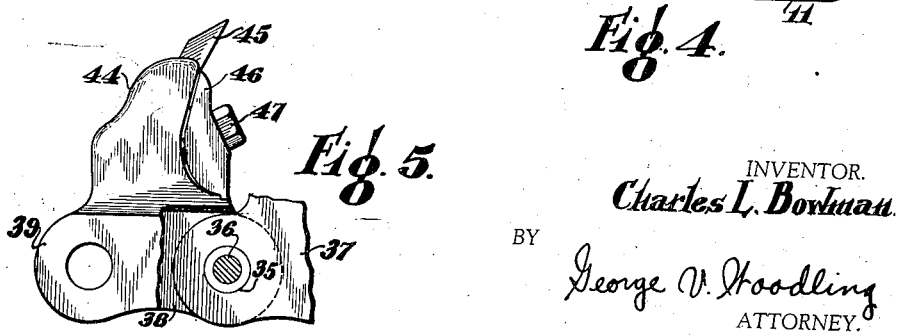
INVENTOR.
Charles L. Bowman.
BY
George V. Woodling
ATTORNEY.

Patented Feb. 22, 1938

2,109,081

UNITED STATES PATENT OFFICE 2,109,081

CUTTER BAR

Charles L. Bowman, Canton, Ohio, assignor to The Bowdil Company, Canton, Ohio, a corporation of Ohio Original application May 24, 1935, Serial No. 23,211. Divided and this application December 12, 1935, Serial No. 54,098

4 Claims. (Cl. 262—33)

My invention relates in general to mining machines, and more particularly to cutter bars and tooth carrying chains.

This application is a division of my application, Serial Number 23,211, filed May 24, 1935 for Mining machines.

In the mining of coal, the cutter bar and the tooth carrying chain cuts a cleft in the lower level of the vein of coal, and forms a shelf which is subsequently broken off by means of explosives or other suitable methods. When cutting the cleft, in the interest of economy, it is highly desirable that the depth of the cleft or cut be as narrow as possible, because the cut-away coal is of no commercial value. Furthermore, it is highly essential that the depth of the cleft cut in the vein of coal be as narrow as possible; because, nowadays, the coal mines have been exhausted to the point that it is necessary to mine much narrower veins than formerly necessary. Thus, if the coal vein is only three or four feet thick, and if the width of the cut in the cleft is as much as six or seven inches, there is a considerably high percentage of loss resulting from the relatively wide cut.

Therefore, an object of my invention is the provision of a relatively thin and solid cutter bar which cuts a very narrow cleft in the vein of coal.

Another object of my invention is the provision of a solid cutter bar that is relatively thin and flexible and that has a variable section modulus to prevent the concentration of stresses as the bar is flexed.

A still further object of my invention is the provision of slidably mounting and slidably adjusting the cutter bar relative to the driving sprocket which drives the tooth carrying chain, so as to take care of the slack in the tooth carrying chain and to keep the tooth carrying chain in the guide channel of the cutter bar.

Another object of my invention is the provision of a tooth carrying chain made up in sections having progressively staggered teeth, which cut a cleft in the vein of coal that is wider than the width of the cutter bar, so as to allow the cutter bar to enter freely in the cleft as it is cut by the tooth carrying chain.

Another object of my invention is the provision of a tooth carrying chain made up of alternately connected female and male body links, the arrangement of the female and male body links being such that there is provided a chain socket to straddle the sprocket teeth of the driving sprocket.

Other objects and a fuller understanding of my invention may be had by referring to the following description and claims, taken in conjunction with the accompanying drawing, in which:

Figure 1 represents a longitudinal plan view of a cutter bar embodying the features of my invention, taken in combination with the driving sprocket which drives a tooth carrying chain in the guide channel of the cutter bar;

Figure 2 represents a longitudinal cross-sectional view of the cutter bar and driving sprocket, taken along the line 2—2 of Figure 1;

Figure 3 represents a longitudinal plan view of a single section of the tooth carrying chain;

Figure 4 is a longitudinal perspective view of a cutter bar embodying the features of my invention; and Figure 5 represents a side elevational view of one of the body links, illustrating a replaceable cutting tooth.

With reference to the drawing, my cutter bar is indicated generally by the reference character 10 and is adapted to be held in operating alignment with a driving sprocket, indicated by the reference character 20 which drives a tooth carrying chain, indicated generally by the reference character 28. In the practice of my invention, the cutter bar 10 may be constructed of one solid piece of steel such as by casting the cutter bar. After the cutter bar is cast, there is milled a guide channel 11 on opposite sides of the cutter bar which receives the tooth carrying chain 28. At the forward or free end of the cutter bar, the guide channel 11 is cut deep at right angles, along the line indicated by the reference character 14. After the deep channel around the end of the cutter bar 10 is cut out, there is positioned in this deep forward channel a substantially semi-circular wear resisting member 12, which may be held in position by means of suitable rivets 13. In this manner there is provided a guide channel 11 for the tooth carrying chain 28 around the forward end of the cutter bar, as well as along the opposite sides thereof. The wear resisting member 12 prevents the forward end of the cutter bar from rapidly wearing away. Then too, after a considerable length of time, if the wear resisting member 12 itself wears away, it may be replaced by a new wear resisting member, this avoiding the necessity of discarding the entire cutter bar.

The cutter bar 10 is slidably mounted relative to the driving sprocket 20. To take care of slidable longitudinal adjustments, there is provided upon the rearward end of the cutter bar 10, a lug 17, through which a threaded adjusting bolt 18 extends. As illustrated, the end of said bolt 18 has a head for rotatively engaging a socket in a boss 23 upon the mining machine. Therefore, by turning the adjusting screw 18, the cutter bar 10 is moved longitudinally relative to the driving sprocket 20. This adjustment takes care of the slack in the tooth cutting chain 28 and keeps the tooth cutting chain within the guide channel 11. Also this longitudinal adjustment provided by the screw 18 affords a means for mounting or dismounting the chain from the cutter bar 10. In order that the rear end of the cutter bar 10 may be drawn as closely as possible to the driving sprocket 20, the rearward central end of the cutter bar 10 is recessed, such as indicated by the reference character 19.

When cutting coal, the cutter bar 10 is frequently subjected to large bending stresses which tend to bend the cutter bar beyond its yielding point, so that when the bar is free it may not return to its original straight position. Therefore, in the construction of my cutter bar, I provide for carrying the section modulus of the cutter bar in order to avoid this bending caused by the concentration of the bending stresses. To accomplish a variable section modulus, I provide longitudinal depressions 15 and 16 on opposite sides of the cutter bar. The width of these depressions 15 and 16, as well as the depth, increases towards the free end of the cutter bar. In other words, the section modulus is small at the free end of the cutter bar and gradually increases to a larger value towards the rear end of the cutter bar. This means that the cutter bar is relatively flexible and thus may be flexed a considerable amount, without permanently bending the bar, such as caused by the large concentration of stresses. By making a depression 15 and 16 upon each side of the cutter bar 10, it is not necessary to make the depressions very deep, as would be the case if the depression were only on one side. Then too, by having a depression upon each side, the neutral bending axis of the cutter bar is directly in the middle of the cutter bar. This means that there is no unequal distribution of stresses when the cutter bar is bent either upwardly or downwardly.

The tooth carrying chain 28 is made up of a plurality of sections, a complete section is shown in Figure 3, and comprises six body links. Each link is arranged to carry a replaceable cutting tooth 45 held in place by a lug 46 and a cap screw 47. In each section, the body links are progressively staggered, so that each cutting tooth 45, carried by the successive body links, cuts at a different place in the cleft of the coal vein. The body links, of the single section, shown in Figure 3, are designated by the reference characters 29, 30, 31, 32, 33, and 34. The width of the cleft is determined by the lateral staggered positions of the cutting teeth 45 carried by the two outside body links 30 and 29 of each section of the tooth carrying chain 28, and is of such value that the width of the cleft is wider than the width of the cutter bar 10, so as to allow the cutter bar to enter freely in the cleft as it is cut by the cutting teeth of the progressively staggered sections.

The tooth carrying chain 28 is constructed of alternately interconnected male and female body links. With reference to Figure 3, the body links designated by the reference characters 29, 31, and 33, are female, and the body links designated by the reference characters 30, 32, and 34, are male. The lower part of the female body link is provided with two spaced side members 38 and 39, which are an integral part of the entire body link. The lower part of the male link is provided with a single interconnecting member 37 which fits between the ends of the two spaced members 38 and 39, and is connected thereto by a rivet pin 36. In order to prevent excessive wear, I employ a case hardened bushing 35 in the male links, through which the chain pin 36 extends. The chain pin 36 is prevented from rotating within the two side members 38 and 39 of the female link, so that the entire rotational movement takes place between the pin 36 and the case hardened bushing 35 in the male links, through which the chain pin 36 extends. The arrangement of the two side members 38 and 39 of the female links and the interconnected member 37 of the male links is such that there is provided a chain socket which straddles the sprocket teeth 21 of the driving sprocket 20. In this manner each link of the chain is used as a cutting link and produces a greater efficiency in cutting operation.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a mining machine, a solid cutter bar having a guide channel in its opposite edges and a deep channel extending around the forward end of the bar, said deep channel having a bottom surface disposed angularly with reference to the bottom surface of the two opposite guide channels, a wear resisting member having a forward arcuate surface and a rearward engaging surface to engage the angular bottom surface of the deep channel, transversely extending means engaging the wear resisting member and the sides of the deep channel for securely mounting the wear resisting member in the deep channel upon the forward end of the cutter bar, the width of the rearward surface of the wear resisting member being substantially the same as the width between the bottom surfaces of the two opposite guide channels and causing the arcuate surface to form the bottom of a guide channel extending around the forward end of the cutter bar of substantially the same depth as the depth of each of the two opposite guide channels.

2. In a mining machine, a solid cutter bar having a guide channel in its opposite edges and a deep channel extending around the forward end of the bar, said deep channel having a bottom surface disposed angularly with reference to the bottom surface of the two opposite guide channels, a wear resisting member having a forward arcuate surface and a rearward engaging surface to engage the angular bottom surface of the deep channel, transversely extending means engaging the wear resisting member and the sides of the deep channel for securely mounting the wear resisting member in the deep channel upon the forward end of the cutter bar, the width of the rearward surface of the wear resisting member being substantially the same as the width between the bottom surfaces of the two opposite guide channels and causing the arcuate surface to form the bottom of a guide channel extending around the forward end of the cutter bar of substantially the same depth as the depth of each of the two opposite guide channels, a tooth carrying chain operating in the channel, driving means for driving the chain, means for slidably mounting the cutter bar in alignment with the driving means, and adjusting means for slidably moving the cutter bar relative to the driving means to take care of slack in the tooth carrying chain and to keep the chain in the guide channel.

3. In a mining machine, a solid cutter bar having a guide channel in its opposite edges and a deep channel extending around the forward end of the bar, said deep channel having a bottom surface disposed angularly with reference to the bottom surface of the two opposite guide channels, a wear resisting member having a forward arcuate surface and a rearward engaging surface to engage the angular bottom surface of the deep channel, transversely extending means engaging the wear resisting member and the sides of the deep channel for securely mounting the wear resisting member in the deep channel upon the forward end of the cutter bar, the width of the rearward surface of the wear resisting member being substantially the same as the width between the bottom surfaces of the two opposite guide channels and causing the arcuate surface to form the bottom of a guide channel extending around the forward end of the cutter bar of substantially the same depth as the depth of each of the two opposite guide channels, a tooth carrying chain operating in the channel, driving means for driving the chain, means for slidably mounting the cutter bar in alignment with the driving means, and adjusting means for slidably moving the cutter bar relative to the driving means to take care of slack in the tooth carrying chain and to keep the chain in the guide channel, the cutter bar being relatively thin and flexible and having a variable longitudinal depressed surface on opposite sides thereof to give a variable section modulus to prevent the concentration of stresses as the bar is flexed and to make the neutral bending axis in substantially the longitudinal center of the cutter bar.

4. In a mining machine, a cutter bar having a guide channel in its opposite edges and a deep channel extending around the forward end of the bar, said deep channel having a bottom surface disposed angularly with reference to the bottom surface of the two opposite guide channels, a wear resisting member having a forward arcuate surface and a rearward engaging surface to engage the angular bottom surface of the deep channel, means engaging the wear resisting member and the cutter bar for securely mounting the wear resisting member in the deep channel upon the forward end of the cutter bar, the width of the rearward surface of the wear resisting member being substantially the same as the width between the bottom surfaces of the two opposite guide channels and causing the arcuate surface to form the bottom of a guide channel extending around the forward end of the cutter bar of substantially the same depth as the depth of each of the two opposite guide channels.

CHARLES L. BOWMAN.